R.J. Morrison,
Mower.
No 16,244.                Patented Dec. 16, 1856.

UNITED STATES PATENT OFFICE.

ROBERT J. MORRISON, OF RICHMOND, VIRGINIA.

IMPROVEMENT IN HARVESTING-MACHINES.

Specification forming part of Letters Patent No. 16,244, dated December 16, 1856.

*To all whom it may concern:*

Be it known that I, ROBERT J. MORRISON, of Richmond, in the county of Henrico and State of Virginia, have invented certain new useful Improvements in Harvesting-Machines; and I do hereby declare the following to be a full, clear, and exact description of the same, reference being had to the accompanying drawings, making a part thereof, in which—

Figure 1:
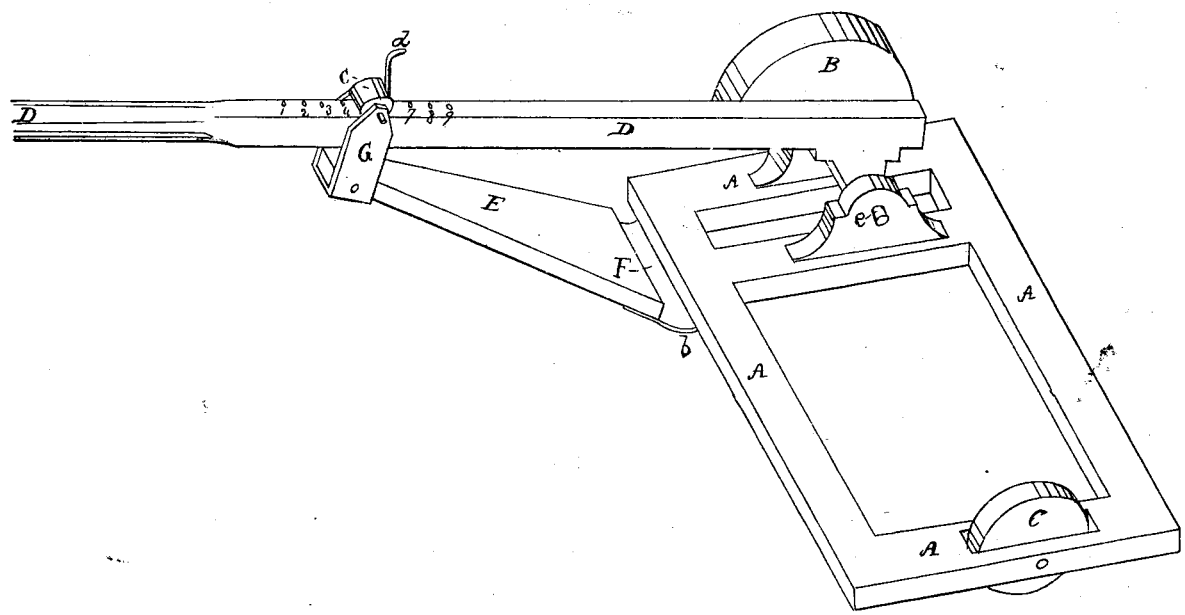
Figure 2:
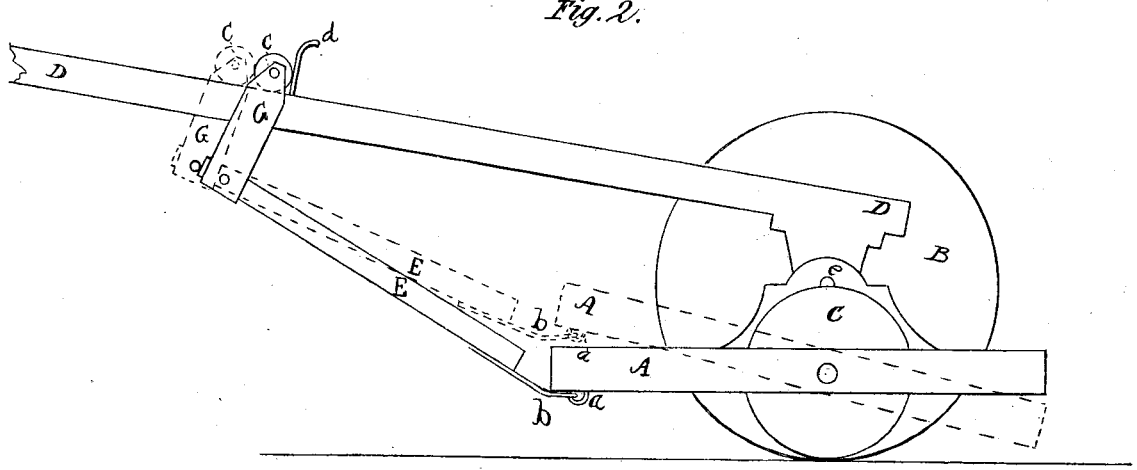

Figure 1 represents a perspective view, and Fig. 2 represents a side elevation, of so much of a harvesting-machine as will illustrate the invention.

Where similar letters of reference occur in the separate figures they denote like parts of the machine in both.

In the preparation of the land in which grain is to be sown water-furrows are made for carrying off the water, and these in many instances become so deep as that when a reaping-machine is drawn over the ground to cut the grain the cutters (however careful the conductor may be) will run into the ground, and thus have their edges marred. So much so is this the case in some neighborhoods and soils as almost to prevent the use of machines for cutting the grain. My object is to avoid this evil consequence, and to make the machine itself its own conductor in passing over these furrows, ditches, or other inequalities in the ground, without depending upon the watchfulness or care of the person managing the machine; and I thus introduce machine-cutting on lands where hitherto machines were deemed almost an impracticability. By making my machine self-conducting I in no wise impair the adjustability of the machine for high or low cutting, for, as will be explained hereinafter, while the cutters are free to rise over any interposing obstacle, they cannot fall below the point at which they for the time being are set.

To enable others skilled in the art to make and use my invention, I will proceed to describe the same with reference to the drawings.

A may represent a frame of any suitable or ordinary construction, supported on the wheels B C in the usual manner.

D is the tongue, which may be hinged at its rear end at or near the supporting-point of the frame in the wheel B, so as to have as little motion as possible at that end.

E is a guard board or plate, hinged to the underside of the frame at any convenient point, as at *a*. To make this hinge I usually employ a metallic plate, F, at the rear end of the guard-board E, in which there is a bend or angle, *b*, so that it may readily pass under the frame, and then have the form necessary to give the guard-board its proper inclination, as shown in the drawings.

On the upper or outer end of the guard-board E is a frame, G, in which a friction-roller, *c*, is so placed as to run or rest on top of the tongue D. Through the tongue are made a series of adjusting-holes, 1 2 3 4, &c., into which a pin, *d*, may fit, for the purpose of adjusting the cutters vertically—that is to say, for setting the cutters at the height at which it is desirable to cut the grain or grass. By such an arrangement of parts it will be seen that the tongue D acts as a lever of the first order, having its fulcra on the axle *e*, and the guard-board E serves as a lever of the second order, connected to D and to the frame A. The point of the tongue being supported by the horses, and its rear end being supported by the frame, the consequence is that whenever the guard-board meets any obstruction it rises up, as shown in red lines in Fig. 2, and the roller *c* runs outward on the tongue, as also shown in red lines, and thus passes over the obstruction, raising and carrying the cutters or front part of the frame over it also. The moment the guard-board or shield passes the obstruction the weight of the front part of the machine causes it to drop down again, and the roller *c* runs back on the tongue D until caught by the pin *d*, which holds it at the adjusted height at which the cutters have been set until another obstruction presents itself. By setting the pin *d* forward or back on the tongue the cutters are raised or lowered at pleasure, and although the front part of the machine may rise at any time to carry the cutters over any obstacle it cannot drop below its adjusted height for the time being. Thus the machine becomes its own conductor in passing ridges, furrows, water-ways, &c., and is prevented from jamming the cutters into the ground and dulling or destroying them.

If it is desirable to remove the weight from the horses' necks, a truck may be placed underneath the tongue D, which would then become a supporting-beam.

Having thus fully described the nature of my invention, what I claim therein as new, and desire to secure by Letters Patent, is—

Hinging the guard or shield by one of its ends to the frame, and supporting the other end thereof on the tongue, so that it may run or move on said tongue when the machine rises or falls to accommodate itself to the inequalities of the ground or for passing over water-courses, substantially as herein described.

ROBT. J. MORRISON.

Witnesses:
P. F. HOWARD,
WM. MUNFORD.